(12) United States Patent
Lu et al.

(10) Patent No.: US 12,520,225 B2
(45) Date of Patent: Jan. 6, 2026

(54) METHOD FOR TERMINAL CONNECTION AND TERMINAL

(71) Applicant: GUANGDONG OPPO MOBILE TELECOMMUNICATIONS CORP., LTD., Guangdong (CN)

(72) Inventors: Qianxi Lu, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 332 days.

(21) Appl. No.: 17/993,501

(22) Filed: Nov. 23, 2022

(65) Prior Publication Data

US 2023/0087258 A1    Mar. 23, 2023

Related U.S. Application Data

(63) Continuation of application No. PCT/CN2020/095534, filed on Jun. 11, 2020.

(51) Int. Cl.
*H04W 40/22* (2009.01)
*H04W 76/10* (2018.01)

(52) U.S. Cl.
CPC .......... *H04W 40/22* (2013.01); *H04W 76/10* (2018.02)

(58) Field of Classification Search
CPC ..... H04W 40/22; H04W 76/10; H04W 12/06; H04W 12/71; H04W 40/12; H04W 76/11; H04W 88/04; H04W 76/14
See application file for complete search history.

(56) References Cited

U.S. PATENT DOCUMENTS

| | | | | |
|---|---|---|---|---|
| 11,140,164 | B2 * | 10/2021 | De Wever | H04L 63/0407 |
| 11,729,696 | B2 * | 8/2023 | Lin | H04L 45/22 |
| | | | | 370/392 |
| 11,838,850 | B2 * | 12/2023 | Zhang | H04W 40/02 |
| 12,120,593 | B2 * | 10/2024 | Wang | H04W 4/023 |
| 12,213,045 | B2 * | 1/2025 | Arvidson | H04W 4/80 |
| 2011/0208842 | A1 | 8/2011 | Mildh et al. | |
| 2016/0302247 | A1 * | 10/2016 | Lu | H04W 8/005 |

(Continued)

FOREIGN PATENT DOCUMENTS

| | | |
|---|---|---|
| CN | 105376868 A | 3/2016 |
| CN | 108207017 A | 6/2018 |

(Continued)

OTHER PUBLICATIONS

Extended European Search Report for EP Application 20939669.6 mailed May 16, 2023. (8 pages).

(Continued)

*Primary Examiner* — Eunsook Choi
(74) *Attorney, Agent, or Firm* — Young Basile Hanlon & MacFarlane, P.C.

(57) ABSTRACT

A method and apparatus for terminal connection are provided. The method includes the following. A first message is transmitted to a second terminal, where the first message is forwarded to a third terminal by the second terminal. A second message forwarded by the second terminal is received, where the second message is generated by the third terminal for a first terminal according to the first message. A connection is established with the third terminal according to the second message.

17 Claims, 4 Drawing Sheets

(56) References Cited

U.S. PATENT DOCUMENTS

| | | | |
|---|---|---|---|
| 2020/0068656 A1* | 2/2020 | Yang | H04W 40/24 |
| 2022/0256434 A1* | 8/2022 | Wang | H04W 4/023 |
| 2023/0354144 A1* | 11/2023 | Fu | H04W 40/22 |

FOREIGN PATENT DOCUMENTS

| | | | |
|---|---|---|---|
| CN | 109246793 A | 1/2019 | |
| CN | 109874180 A | 6/2019 | |
| EP | 3579642 A1 | 12/2019 | |
| NO | 2020011907 A1 | 1/2020 | |

OTHER PUBLICATIONS

International Search Report and Written Opinion with English Translation for PCT Application PCT/CN2020/095534 mailed Jan. 26, 2021. (19 pages).

3GPP TR 23.752 V17.0.0 (Mar. 2021); Technical Specification Group Services and System Aspects; Study on system enhancement for Proximity based Services; (ProSe) in the 5G System (5GS); Release 17. (183 pages).

European Examination report issued in corresponding EP Application No. 20939669.6, dated Sep. 10, 2025, 7 pages.

\* cited by examiner

METHOD FOR TERMINAL CONNECTION AND TERMINAL

CROSS-REFERENCE TO RELATED APPLICATION(S)

This application is a continuation of International application No. PCT/CN 2020/095534, filed Jun. 11, 2020, the entire disclosure of which is hereby incorporated by reference.

TECHNICAL FIELD

This application relates to the field of communication technology, and particularly to a method for terminal connection and a terminal.

BACKGROUND

Implementing remote-terminal connection via a relay terminal is to implement relay connection based on a layer-2 identity (L2-ID), that is, different end-to-end links will be assigned different L2-IDs. However, in such manner of implementing remote-terminal connection via a relay terminal, control of an access network is not taken into consideration, and the manner is based on a scheme in which a link is established completely based on autonomous behavior of terminal devices.

Therefore, in such manner of implementing remote-terminal connection via a relay terminal, since a relay terminal assigns different L2-IDs to different end-to-end links, the quantity of radio link control (RLC) entities supported by the relay terminal will increase with the quantity of end-to-end links, which is high in complexity. In addition, when a terminal device is within an access-network coverage, route establishment cannot be globally optimized through control of the access network, which has a technical problem of high complexity of terminal connection procedure and poor optimization configuration.

SUMMARY

Implementations of the disclosure provide a method for terminal connection. The method is applied to a first terminal. The method includes the following. A first message is transmitted to a second terminal, where the first message is forwarded to a third terminal by the second terminal. A second message forwarded by the second terminal is received, where the second message is generated by the third terminal for the first terminal according to the first message. A connection is established with the third terminal according to the second message.

Implementations of the disclosure provide a method for terminal connection. The method is applied to a second terminal. The method includes the following. A first message transmitted by a first terminal is received. The first message is forwarded to a third terminal. A second message transmitted by the third terminal is received, where the second message is generated by the third terminal for the first terminal according to the first message. The second message is forwarded to the first terminal.

Implementations of the disclosure provide a terminal. The terminal is a first terminal. The terminal includes a transceiver, a processor, and a memory storing computer programs. When executed by the processor, the computer programs are operable with the processor to: cause the transceiver to transmit a first message to a second terminal, where the first message is forwarded to a third terminal by the second terminal; cause the transceiver to receive a second message forwarded by the second terminal, where the second message is generated by the third terminal for a first terminal according to the first message; and establish a connection with the third terminal according to the second message.

BRIEF DESCRIPTION OF DRAWINGS

The accompanying drawings herein, which are incorporated in and constitute a part of the specification, illustrate implementations consistent with the disclosure, and together with the specification, are intended to explain the principles of the disclosure.

DETAILED DESCRIPTION

Figure 1:
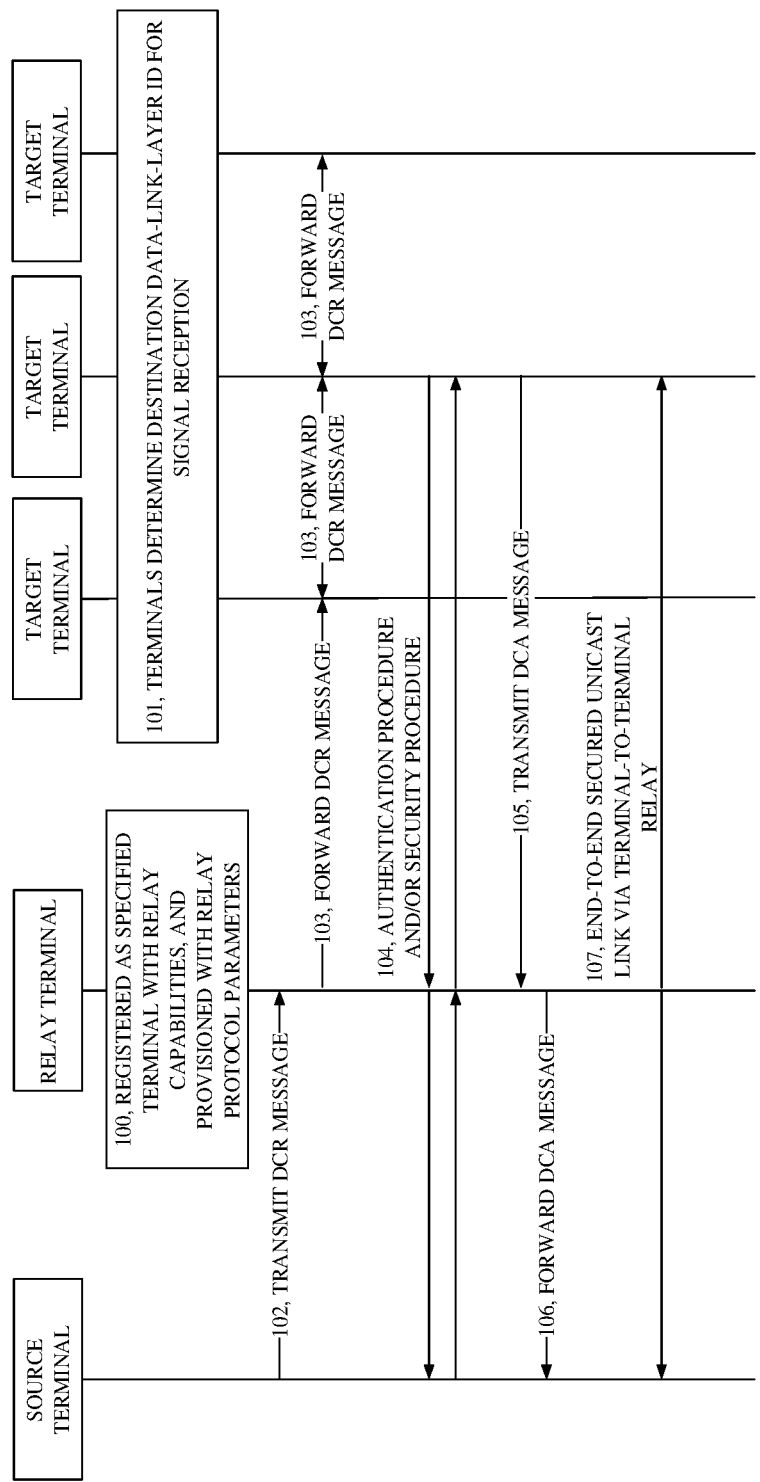
FIG. 1 is a network architectural diagram of a communication system to which implementations of the disclosure may be applied.

Exemplary implementations will be described in detail herein, and examples of these implementations are illustrated in the accompanying drawings. When the following elaborations relate to the accompanying drawings, unless otherwise stated, the same numerals in different accompanying drawings refer to the same or similar elements. The embodiments described in the following exemplary implementations are not intended to represent all embodiments consistent with the implementations of the disclosure. Instead, they are merely examples of methods and apparatuses consistent with some aspects of the disclosure as elaborated in the appended claims. Based on the implementations of the disclosure, all other implementations obtained by those skilled in the art without creative effort shall fall within the protection scope of the disclosure.

In a system architecture, an exemplary communication system may be a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems, etc.

Generally speaking, a conventional communication system supports a limited number of connections and therefore is easy to implement. However, with development of communication technology, a mobile communication system will not only support conventional communication but also support, for example, a proximity-based service (ProSe), device to device (D2D) communication, machine to machine (M2M) communication, machine type communication (MTC), vehicle to vehicle (V2V) communication, vehicle to everything (V2X), etc. Implementations of the disclosure can also be applied to these communication systems.

A user terminal in implementations of the disclosure may include various devices with wireless communication functions such as handheld devices, in-vehicle devices, wearable devices, computing devices or other processing devices connected to a wireless modem, and various forms of user equipment (UE), mobile stations (MS), terminal devices, etc. For the convenience of illustration, the devices mentioned above are collectively referred to as "terminal device".

In addition, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, in implementations of the disclosure, "B corresponding to A" indicates that B is associated with A, and B may be determined according to A. However, it should be further understood that, "determine B according to A" does not mean that B is determined according to A only, and B may also be determined according to A and/or other information.

FIG. 1 illustrates a system architecture of a communication system to which the following implementations of the disclosure may be applied. The system architecture includes source terminal A, relay terminal B, and target terminal C.

Remote terminals (i.e. remote UEs) include source terminal A and target terminal C which are connected with each other via one or more relay terminals B (i.e. relay UEs). The remote terminal and relay terminal B are connected with each other over a PC5 interface of a $3^{rd}$ generation partnership project (3GPP) system, or relay terminals B are connected with each other over a PC5 interface of a 3GPP system. In a method for remote-terminal connection between source terminal A and target terminal C via relay terminal B, in step 102 and step 103, a direct communication request (DCR) message is forwarded by relay terminal B, where relay terminal B inserts a relay identifier into the DCR message and forwards the DCR message. During forwarding, relay terminal B assigns separate layer-2 identities (L2-ID) or L2 addresses to different source terminals A in order for data forwarding, where L2 is a data link layer. Functions supported by L2 (that is, data link layer) include, but are not limited to, a medium access control (MAC) layer, a radio link control (RLC) layer, a packet data convergence protocol (PDCP) layer, a scheduling function, an automatic repeat request (ARQ) function, a function of division and connection of RLC-protocol data units (PDU), etc.

In step 104, once receiving the DCR message forwarded by relay terminal B, target terminal C starts an authentication and security procedure. In this procedure, target terminal C uses an L2-ID that is assigned by relay terminal B. Relay terminal B forwards an authentication-and-security related message to source terminal A. During forwarding, relay terminal B assigns separate L2-IDs to different target terminals C in order for data forwarding. In subsequent communication, separate L2 addresses assigned to source terminal A and target terminal C by relay terminal B are used for relay communication.

However, in such method for remote-terminal connection via a relay terminal, relay is realized based on substitution of L2-IDs. Since a relay terminal assigns different L2-IDs to different end-to-end links, when there are multiple end-to-end links, the quantity of RLC entities supported by the relay terminal will increase with the quantity of end-to-end links, which is high in complexity. In addition, when a terminal device is within an access-network coverage, route establishment cannot be globally optimized through control of the access network, which has a technical problem of high complexity of terminal connection procedure and poor optimization configuration.

The following implementations of the disclosure will elaborate how to implement terminal connection, thereby realizing adaptive optimization of terminal connection.

Figure 2:
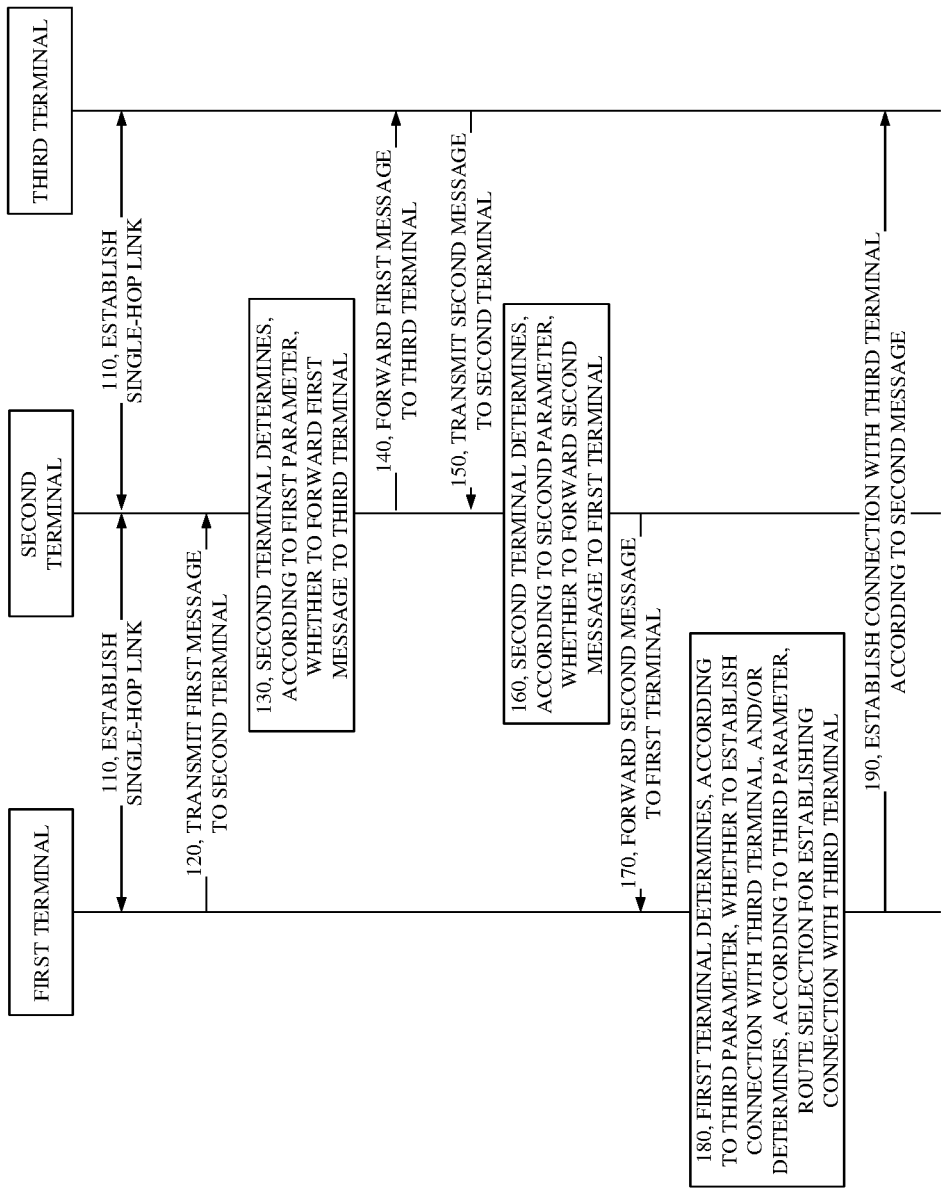
FIG. 2 is a flowchart of a method for terminal connection according to implementation I of the disclosure.

FIG. 2 is a flowchart of a method for terminal connection provided in implementation I of the disclosure. The method includes the following.

Step 110, a single-hop link is established between a first terminal and a second terminal and/or between the second terminal and a third terminal.

Optionally, a single-hop link is established as follows. A radio bearer for relay is established.

Optionally, the radio bearer includes a unicast signaling bearer and/or a broadcast signaling bearer.

Step 120, the first terminal transmits a first message to the second terminal.

The first terminal can transmit the first message to a nearby second terminal, where the nearby second terminal includes a terminal device that can establish a single-hop link with the first terminal.

Optionally, the first message includes a DCR message.

Optionally, the DCR message contains relay-indication information.

Optionally, the relay-indication information indicates whether the DCR message can be relayed, and/or indicates the number of times the DCR message can be relayed.

Step 130, the second terminal determines, according to a first parameter, whether to forward the first message to the third terminal.

Once receiving the first message, the second terminal determines, according to the first parameter, whether the first message can be relayed. After determining that the first message can be relayed, the second terminal forwards the first message to the third terminal. Optionally, the first parameter includes at least one of: a channel-quality related parameter, a service related parameter, or an ID of the first terminal and/or an ID of the third terminal. The channel-quality related parameter may include a reference signal receiving power (RSRP), a channel busy ratio (CBR), a signal to interference plus noise ratio (SINR), and a received signal strength indicator (RSSI).

Step 140, the second terminal forwards the first message to the third terminal.

Optionally, step 140 may include the following.

The second terminal transmits indication information of the ID of the first terminal to the third terminal when forwarding the first message.

When forwarding the first message to the third terminal, the second terminal can transmit the indication information of the ID of the first terminal to the third terminal. The indication information of the ID of the first terminal is not contained in the first message.

Optionally, the first message contains indication information of the ID of the first terminal.

When forwarded by the second terminal to the third terminal, the first message can contain the indication information of the ID of the first terminal.

Optionally, the indication information of the ID of the first terminal includes a data-link-layer ID of the first terminal.

The indication information may be the data-link-layer ID of the first terminal, that is, L2 ID or L2 address. The data-link-layer ID of the first terminal may be a data-link-layer ID of the first terminal at a relay protocol layer. By exchanging of an L2-ID of the first terminal and an L2-ID of the third terminal at the relay protocol layer, the second terminal can reuse an RLC entity to realize relay communication for multiple end-to-end links.

Optionally, after step 140, the method may include the following.

A single-hop link is established between the second terminal and the third terminal.

If a single-hop link has not yet been established between the second terminal and the third terminal after the first message is forwarded to the third terminal by the second terminal, a single-hop link will be established between the second terminal and the third terminal.

Step 150, the third terminal transmits a second message to the second terminal.

The third terminal receives the first message forwarded by the second terminal, and determines whether a connection can be established with the first terminal. After the second message is generated for the first terminal according to the first message by the third terminal once the third terminal determines that a connection can be established with the first terminal, the third terminal transmits the second message to the second terminal. The second message includes an authentication message, a security message, and/or a direct communication accept (DCA) message.

Step 160, the second terminal determines, according to a second parameter, whether to forward the second message to the first terminal.

After the second message is received by the second terminal, the second terminal determines, according to the second parameter, whether the second message can be relayed. Once determining that the second message can be relayed, the second terminal forwards the second message to the first terminal. Optionally, the second parameter includes at least one of: a channel-quality related parameter, a service related parameter, or an ID of the first terminal and/or an ID of the third terminal. The channel-quality related parameter may include an RSRP, a CBR, an SINR, and an RSSI.

Step 170, the second terminal forwards the second message to the first terminal.

Optionally, step 170 may include the following.

The second terminal transmits indication information of the ID of the third terminal to the first terminal when forwarding the second message.

When forwarding the second message to the first terminal, the second terminal can transmit the indication information of the ID of the third terminal to the first terminal. The indication information of the ID of the third terminal is not contained in the second message.

Optionally, the second message contains indication information of the ID of the third terminal.

When forwarded by the second terminal to the first terminal, the second message can contain the indication information of the ID of the third terminal.

Optionally, the indication information of the ID of the third terminal includes a data-link-layer ID of the third terminal.

The indication information may be the data-link-layer ID of the third terminal, that is, L2 ID or L2 address. The data-link-layer ID of the third terminal may be a data-link-layer ID of the third terminal at a relay protocol layer, which is conducive to exchange of an L2-ID of the first terminal and an L2-ID of the third terminal at the relay protocol layer. As such, the second terminal can reuse an RLC entity to realize relay communication for multiple end-to-end links.

Optionally, after step 170, the method can include the following.

A single-hop link is established between the first terminal and the second terminal.

If a single-hop link has not yet been established between the first terminal and the second terminal after the second message is forwarded to the first terminal by the second terminal, a single-hop link will be established between the first terminal and the second terminal.

Step 180, the first terminal determines, according to a third parameter, whether to establish a connection with the third terminal, and/or determines, according to the third parameter, a route selection for establishing the connection with the third terminal.

After a third parameter is received by the first terminal, the first terminal determines, according to the third parameter, whether a connection can be established with the third terminal, and/or determines, according to the third parameter, the route selection for establishing the connection with the third terminal. Once determining that a connection can be established with the third terminal, the first terminal establishes a connection with the third terminal. Optionally, the third parameter includes at least one of: a channel-quality related parameter, a service related parameter, or an ID of the first terminal and/or an ID of the third terminal. The channel-quality related parameter may include an RSRP, a CBR, an SINR, and an RSSI.

Step 190, a connection is established with the third terminal according to the second message.

The first terminal establishes a connection with the third terminal according to the second message. The first terminal and the third terminal perform relay communication of signaling and/or data by establishing a link for communication. During the communication, an L2-ID of a peer terminal device is used at a relay protocol layer, such that relayed signaling/data can reach the peer terminal device via the second terminal.

Optionally, the first parameter, the second parameter, and/or the third parameter is configured by an access network, configured by a core network, and/or pre-configured.

For the first parameter, the second parameter, and the third parameter configured by an access network or configured by a core network, such configuration may be pre-issued by the access network or the core network, or issued by the access network or the core network once triggered by reporting of the terminal device to the access network or the core network. The first parameter, the second parameter, and the third parameter configured by an access network and configured by a core network may be transmitted based on a relay protocol and/or via sidelink signaling, where the sidelink signaling includes PC5-S signaling. The pre-configured first parameter, the second parameter, and the third parameter may be pre-stored in a corresponding terminal device.

Optionally, the first message, the second message, the indication information of the ID of the first terminal, and/or the indication information of the ID of the third terminal is transmitted based on a relay protocol and/or via sidelink signaling.

The first message, the second message, the indication information of the ID of the first terminal, and the indication information of the ID of the third terminal may be transmitted based on a relay protocol. In addition, the relay protocol may pre-define parameters related to a broadcast signaling bearer for relay. The first message, the second message, the indication information of the ID of the first terminal, and the indication information of the ID of the third terminal may also be transmitted via sidelink signaling, where the sidelink signaling includes PC5-S signaling.

According to implementation I herein, through exchange of L2-IDs from the first terminal to the third terminal during link establishment, a relay protocol layer is used for relay communication. As such, based on the L2-ID of the first terminal and the L2-ID of the third terminal, communication regarding different links from the first terminal to the third terminal can be realized without assigning different L2-IDs to each link, which facilitates reuse of an RLC entity by a relay terminal, that is, the second terminal, to serve multiple end-to-end links. The exchange of L2-IDs from the first terminal to the third terminal can be implemented at the relay protocol layer, or may be implemented via sidelink signaling, including transmission via PC5-S signaling. In addition, by introducing network signaling of an access network and/or a core network during link establishment, it is possible to realize relay communication under network control.

Figure 3:
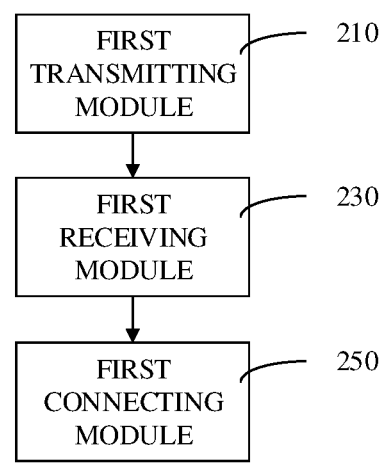
FIG. 3 is a block diagram of an apparatus for terminal connection provided in implementation II of the disclosure.

FIG. 3 is a block diagram of an apparatus for terminal connection provided in implementation II of the disclosure. As illustrated in FIG. 3, the apparatus is a first terminal. The apparatus includes, but is not limited to, a first transmitting module 210, a first receiving module 230, and a first connecting module 250. The first transmitting module 210 is configured to transmit a first message to a second terminal, where the first message is forwarded to a third terminal by the second terminal. The first receiving module 230 is configured to receive a second message forwarded by the second terminal, where the second message is generated by the third terminal for the first terminal according to the first message. The first connecting module 250 is configured to establish a connection with the third terminal according to the second message.

Optionally, the first transmitting module 210 is specifically configured to: the first message is determined according to a first parameter by the second terminal to be forwarded to the third terminal.

Optionally, the first parameter includes at least one of: a channel-quality related parameter, a service related parameter, or an ID of the first terminal and/or an ID of the third terminal.

Optionally, the first transmitting module 210 is further configured to: indication information of the ID of the first terminal is transmitted to the third terminal by the second terminal when forwarding the first message.

Optionally, the first message contains indication information of the ID of the first terminal.

Optionally, the indication information of the ID of the first terminal includes a data-link-layer ID of the first terminal.

Optionally, the first receiving module 230 is specifically configured to receive the second message that is determined according to a second parameter by the second terminal to be forwarded to the first terminal.

Optionally, the second parameter includes at least one of: a channel-quality related parameter, a service related parameter, or an ID of the first terminal and/or an ID of the third terminal.

Optionally, the first receiving module 230 is further configured to receive indication information of the ID of the third terminal that is transmitted to the first terminal by the second terminal when forwarding the second message.

Optionally, the second message contains indication information of the ID of the third terminal.

Optionally, the indication information of the ID of the third terminal includes a data-link-layer ID of the third terminal.

Optionally, the apparatus further includes a first determining module. The first determining module is configured for the first terminal to determine, according to a third parameter, to establish a connection with the third terminal, and/or determine, according to the third parameter, a route selection for establishing the connection with the third terminal.

Optionally, the third parameter includes at least one of: a channel-quality related parameter, a service related parameter, or an ID of the first terminal and/or an ID of the third terminal.

Optionally, the first connecting module 250 is further configured to establish a single-hop link between the first terminal and the second terminal and/or between the second terminal and the third terminal.

Optionally, the first connecting module 250 is further configured to establish a single-hop link between the second terminal and the third terminal.

Optionally, the first connecting module 250 is further configured to establish a single-hop link between the first terminal and the second terminal.

Optionally, a single-hop link is established as follows. A radio bearer for relay is established.

Optionally, the radio bearer includes a unicast signaling bearer and/or a broadcast signaling bearer.

Optionally, the first parameter, the second parameter, and/or the third parameter is configured by an access network, configured by a core network, and/or pre-configured.

Optionally, the first message, the second message, the indication information of the ID of the first terminal, and/or the indication information of the ID of the third terminal is transmitted based on a relay protocol and/or via sidelink signaling.

Optionally, the first message includes a DCR message.

Optionally, the second message includes an authentication message, a security message, and/or a DCA message.

Optionally, the DCR message contains relay-indication information.

Optionally, the relay-indication information indicates whether the DCR message can be relayed, and/or indicates a number of times the DCR message can be relayed.

For the implementation process of the function and role of each module and other parts that are not described or defined in detail in this implementation, reference can be made to the elaboration in implementation I described above, which will not be repeated herein.

Figure 4:
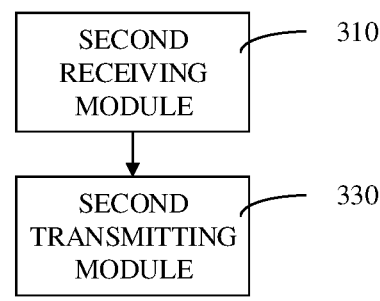
FIG. 4 is a block diagram of an apparatus for terminal connection provided in implementation III of the disclosure.

FIG. 4 is a block diagram of an apparatus for terminal connection provided in implementation III of the disclosure. As illustrated in FIG. 4, the apparatus is a second terminal. The apparatus includes, but is not limited to, a second receiving module 310 and a second transmitting module 330. The second receiving module 310 is configured to receive a first message transmitted by a first terminal. The second transmitting module 330 is configured to forward the first message to a third terminal. The second receiving module 310 is further configured to receive a second message transmitted by the third terminal, where the second message is generated by the third terminal for the first terminal according to the first message. The second transmitting module 330 is further configured to forward the second message to the first terminal.

Optionally, the apparatus further includes a second determining module 350. The second determining module 350 is configured for the second terminal to determine, according to a first parameter, to forward the first message to the third terminal.

Optionally, the first parameter includes at least one of: a channel-quality related parameter, a service related parameter, or an ID of the first terminal and/or an ID of the third terminal.

Optionally, the second transmitting module 330 is further configured for the second terminal to transmit to the third terminal indication information of the ID of the first terminal when forwarding the first message.

Optionally, the first message contains indication information of the ID of the first terminal.

Optionally, the indication information of the ID of the first terminal includes a data-link-layer ID of the first terminal.

Optionally, the second determining module 350 is further configured for the second terminal to determine, according to a second parameter, to forward the second message to the first terminal.

Optionally, the second parameter includes at least one of: a channel-quality related parameter, a service related parameter, or an ID of the first terminal and/or an ID of the third terminal.

Optionally, the second transmitting module 330 is further configured for the second terminal to transmit to the first terminal indication information of the ID of the third terminal when forwarding the second message.

Optionally, the second message contains indication information of the ID of the third terminal.

Optionally, the indication information of the ID of the third terminal includes a data-link-layer ID of the third terminal.

Optionally, the second determining module 350 is further configured to: according to a third parameter, a connection with the third terminal is determined by the first terminal to be established, and/or a route selection for establishing the connection with the third terminal is determined according to the third parameter.

Optionally, the third parameter includes at least one of: a channel-quality related parameter, a service related parameter, or an ID of the first terminal and/or an ID of the third terminal.

Optionally, the apparatus further includes a second connecting module 370. The second connecting module 370 is configured to establish a single-hop link between the first terminal and the second terminal and/or between the second terminal and the third terminal.

Optionally, the second connecting module 370 is further configured to establish a single-hop link between the second terminal and the third terminal.

Optionally, the second connecting module 370 is further configured to establish a single-hop link between the first terminal and the second terminal.

Optionally, a single-hop link is established as follows. A radio bearer for relay is established.

Optionally, the radio bearer includes a unicast signaling bearer and/or a broadcast signaling bearer.

Optionally, the first parameter, the second parameter, and/or the third parameter is configured by an access network, configured by a core network, and/or pre-configured.

Optionally, the first message, the second message, the indication information of the ID of the first terminal, and/or the indication information of the ID of the third terminal is transmitted based on a relay protocol and/or via sidelink signaling.

Optionally, the first message includes a DCR message.

Optionally, the second message includes an authentication message, a security message, and/or a DCA message.

Optionally, the DCR message contains relay-indication information.

Optionally, the relay-indication information indicates whether the DCR message can be relayed, and/or indicates a number of times the DCR message can be relayed.

For the implementation process of the function and role of each module and other parts that are not described or defined in detail in this implementation, reference can be made to the elaboration in implementation I described above, which will not be repeated herein.

Figure 5:
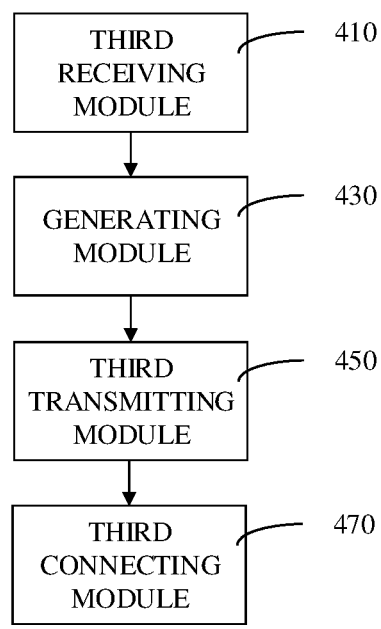
FIG. 5 is a block diagram of an apparatus for terminal connection provided in implementation IV of the disclosure.

FIG. 5 is a block diagram of an apparatus for terminal connection provided in implementation IV of the disclosure. As illustrated in FIG. 5, the apparatus is a third terminal. The apparatus includes, but is not limited to, a third receiving module 410, a generating module 430, a third transmitting module 450, and a third connecting module 470. The third receiving module 410 is configured to receive a first message forwarded by a second terminal. The generating module 430 is configured to generate a second message for a first terminal according to the first message. The third transmitting module 450 is configured to transmit the second message to the second terminal. The third connecting module 470 is configured to accept a connection established by the first terminal according to the second message.

Optionally, the third receiving module 410 is specifically configured to receive the first message that is determined according to a first parameter by the second terminal to be forwarded.

Optionally, the first parameter includes at least one of: a channel-quality related parameter, a service related parameter, or an ID of the first terminal and/or an ID of the third terminal.

Optionally, the third receiving module 410 is further configured to receive indication information of the ID of the first terminal transmitted to the third terminal by the second terminal when forwarding the first message.

Optionally, the first message contains indication information of the ID of the first terminal.

Optionally, the indication information of the ID of the first terminal includes a data-link-layer ID of the first terminal.

Optionally, the apparatus further includes a third determining module 490. The second terminal determines, according to a second parameter, to forward the second message to the first terminal.

Optionally, the second parameter includes at least one of: a channel-quality related parameter, a service related parameter, or an ID of the first terminal and/or an ID of the third terminal.

The second terminal transmits indication information of the ID of the third terminal to the first terminal when forwarding the second message.

Optionally, the second message contains indication information of the ID of the third terminal.

Optionally, the indication information of the ID of the third terminal includes a data-link-layer ID of the third terminal.

Optionally, the third connecting module 470 is specifically configured to accept a connection that is determined to be established according to a third parameter by the first terminal, and/or accept a route selection that is used for establishing the connection and determined according to the third parameter by the first terminal.

Optionally, the third parameter includes at least one of: a channel-quality related parameter, a service related parameter, or an ID of the first terminal and/or an ID of the third terminal.

Optionally, the third connecting module 470 is further configured to establish a single-hop link between the first terminal and the second terminal and/or between the second terminal and the third terminal.

Optionally, the third connecting module 470 is further configured to establish a single-hop link between the second terminal and the third terminal.

Optionally, the third connecting module 470 is further configured to establish a single-hop link between the first terminal and the second terminal.

Optionally, a single-hop link is established as follows. A radio bearer for relay is established.

Optionally, the radio bearer includes a unicast signaling bearer and/or a broadcast signaling bearer.

Optionally, the first parameter, the second parameter, and/or the third parameter is configured by an access network, configured by a core network, and/or pre-configured.

Optionally, the first message, the second message, the indication information of the ID of the first terminal, and/or the indication information of the ID of the third terminal is transmitted based on a relay protocol and/or via sidelink signaling.

Optionally, the first message includes a DCR message.

Optionally, the second message includes an authentication message, a security message, and/or a DCA message.

Optionally, the DCR message contains relay-indication information.

Optionally, the relay-indication information indicates whether the DCR message can be relayed, and/or indicates a number of times the DCR message can be relayed.

For the implementation process of the function and role of each module and other parts that are not described or defined in detail in this implementation, reference can be made to the elaboration in implementation I described above, which will not be repeated herein.

Figure 6:
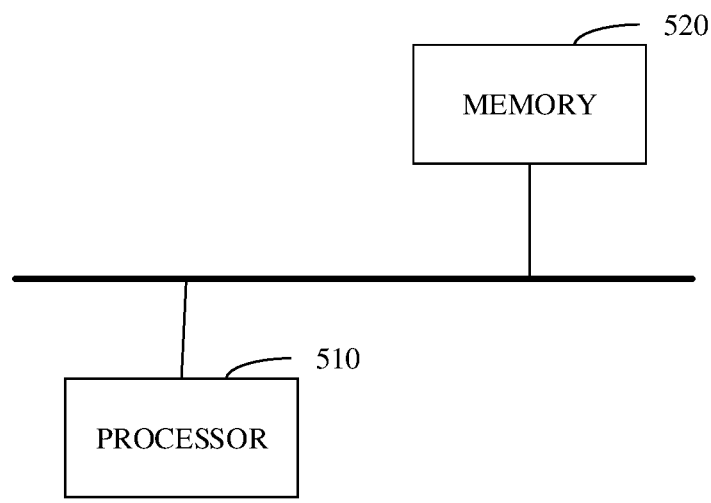
FIG. 6 is a schematic diagram illustrating a hardware structure of an apparatus for terminal connection provided in implementation V of the disclosure.

FIG. 6 is a schematic diagram illustrating a hardware structure of an apparatus for terminal connection provided in implementation V of the disclosure. As illustrated in FIG. 6, the apparatus includes a processor 510 and a memory 520. Various components above of the apparatus are in communication connection with each other via a bus system.

The memory 520 is configured to store programs executable by the processor 510. The processor 510, when executing the programs, implements some or all operations of the method for terminal connection in method implementation I described above.

The processor 510 may be a separate component, or may be a general term for multiple processing components. For example, the processor 510 may be a central processing unit (CPU), or may be an application-specific integrated circuit (ASIC), or may be configured as one or more ICs for performing the foregoing method, such as at least one micro-processor (such as digital signal processor (DSP)) or at least one field programmable gate array (FPGA), etc.

Those skilled in the art will appreciate that, in one or more of the foregoing examples, all or part of functions described in implementations of the disclosure can be implemented through software, hardware, firmware, or any other combination thereof. When implemented by software, all or part of the functions can be implemented by executing software instructions by a processor. The software instructions can be implemented by corresponding software modules. The software modules can be stored in a computer-readable storage medium. The computer-readable storage medium can be any computer accessible usable-medium or a data storage device such as a server, a data center, or the like which integrates one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc. The computer-readable storage medium includes, but is not limited to, a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary computer-readable storage medium is coupled to a processor, such that the processor can read information from the computer-readable storage medium and write information to the computer-readable storage medium. The computer-readable storage medium can also be a component of the processor. The processor and the computer-readable storage medium may be located in an ASIC. In addition, the ASIC can be located in an access-network device, a target network device, or a core-network device. The processor and the computer-readable storage medium may also be present as discrete components in the access-network device, the target network device, or the core-network device. When implemented by software, all or part of the functions can also be implemented in the form of a computer program product. The computer program product includes one or more computer instructions. When the computer instructions are applied and executed on a computer or a chip, all or part of the operations or functions of the implementations of the disclosure are performed. The computer can be a general-purpose computer, a special-purpose computer, a computer network, or other programmable apparatuses. The computer instruction can be stored in the computer-readable storage medium above, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be, for example, a memory storing computer readable storage programs or instructions. The computer readable storge programs or instructions, when executed with the processor, are operable with the processor, such as to cause a transceiver of the apparatus, to implement all or part of functions described in implementations of the disclosure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for terminal connection, applied to a first terminal and comprising:
    transmitting a first message to a second terminal, the first message being forwarded to a third terminal by the second terminal;
    receiving a second message forwarded by the second terminal, the second message being generated by the third terminal for the first terminal according to the first message; and
    establishing a connection with the third terminal according to the second message;
    wherein the first message is determined to be forwarded to the third terminal by the second terminal according to a first parameter, and the first parameter comprises a channel-quality related parameter.

2. The method of claim 1, wherein the first parameter further comprises at least one of: a service related parameter, or an identity (ID) of the first terminal and/or an ID of the third terminal.

3. The method of claim 1, wherein receiving the second message forwarded by the second terminal comprises:
    receiving the second message that the second terminal determines according to a second parameter to forward to the first terminal.

4. The method of claim 3, wherein the second parameter comprises at least one of: a channel-quality related parameter, a service related parameter, or an ID of the first terminal and/or an ID of the third terminal.

5. The method of claim 1, wherein before establishing a connection with the third terminal according to the second message, the method further comprises:
    determining, according to a third parameter, by the first terminal, to establish a connection with the third terminal, and/or determining, according to the third parameter, by the first terminal, a route selection for establishing the connection with the third terminal.

6. The method of claim 5, wherein the third parameter comprises at least one of: a channel-quality related parameter, a service related parameter, or an ID of the first terminal and/or an ID of the third terminal.

7. The method of claim 1, wherein before establishing a connection with the third terminal according to the second message, the method further comprises:
    establishing a single-hop link between the first terminal and the second terminal.

8. A method for terminal connection, applied to a third terminal and comprising:
    receiving a first message forwarded by a second terminal;
    generating a second message for a first terminal according to the first message;
    transmitting the second message to the second terminal; and
    accepting a connection established by the first terminal according to the second message;
    wherein forwarding of the first message to the third terminal is determined by the second terminal according to a first parameter, and the first parameter comprises a channel-quality related parameter.

9. The method of claim 8, wherein the first parameter further comprises at least one of: a service related parameter, or an identity (ID) of the first terminal and/or an ID of the third terminal.

10. The method of claim 8, wherein accepting the connection established by the first terminal according to the second message comprises:
    accepting a connection that the first terminal determines according to a third parameter to establish, and/or accepting a route selection that is used for establishing the connection and determined according to the third parameter by the first terminal.

11. The method of claim 10, wherein the third parameter comprises at least one of: a channel-quality related parameter, a service related parameter, or an ID of the first terminal and/or an ID of the third terminal.

12. The method of claim 8, wherein after receiving the first message forwarded by the second terminal, the method further comprises:
    establishing a single-hop link between the second terminal and the third terminal.

13. An apparatus, being a first terminal and comprising:
    a transceiver;
    a processor; and
    a memory storing computer readable programs which, when executed with the processor, are operable with the processor to:
        cause the transceiver to transmit a first message to a second terminal, the first message being forwarded to a third terminal by the second terminal;
        cause the transceiver to receive a second message forwarded by the second terminal, the second message being generated by the third terminal for the first terminal according to the first message; and
        establish a connection with the third terminal according to the second message;
    wherein the first message is determined to be forwarded to the third terminal by the second terminal according to a first parameter, and the first parameter comprises a channel-quality related parameter.

14. The apparatus of claim 13, wherein the first parameter further comprises at least one of: a service related parameter, or an identity (ID) of the first terminal and/or an ID of the third terminal.

15. The apparatus of claim 13, wherein transceiver is configured to:
    receive the second message that the second terminal determines according to a second parameter to forward to the first terminal.

16. The apparatus of claim 15, wherein the second parameter comprises at least one of: a channel-quality related parameter, a service related parameter, or an ID of the first terminal and/or an ID of the third terminal.

17. The apparatus of claim 13, wherein the processor is further configured to:
    determine, according to a third parameter, to establish a connection with the third terminal, and/or determine, according to the third parameter, a route selection for establishing the connection with the third terminal.

* * * * *